United States Patent [19]

Pitz

[11] Patent Number: 4,643,906

[45] Date of Patent: Feb. 17, 1987

[54] LACTOSE-FREE SYNTHETIC ICE CREAM

[76] Inventor: Doris E. Pitz, Cottonwood Creek Ranch, Star Rte., Worland, Wyo. 82401

[21] Appl. No.: 781,019

[22] Filed: Sep. 27, 1985

[51] Int. Cl.$^4$ .............................................. A23G 9/00
[52] U.S. Cl. .................................. 426/565; 426/613; 426/104
[58] Field of Search ............... 426/565, 566, 567, 613, 426/104

[56] References Cited

U.S. PATENT DOCUMENTS

| | | | |
|---|---|---|---|
| 2,738,279 | 3/1956 | Stimpson et al. | 426/565 |
| 3,003,882 | 10/1961 | Peat | 426/565 |
| 3,433,651 | 3/1969 | Diamond | 426/565 |
| 3,556,813 | 1/1971 | Creswick | 426/567 |
| 4,333,954 | 6/1982 | Trzecieski | 426/565 |
| 4,374,861 | 2/1983 | Trzecieski | 426/565 |

*Primary Examiner*—Jeanette Hunter
*Attorney, Agent, or Firm*—Herman H. Bains

[57] ABSTRACT

A lactose-free synthetic ice cream product comprising from about 45% by weight of a liquid non-dairy emulsion containing vegetable fat, from about 25% of a stable foamed non-dairy emulsion including hydrogenated vegetable fat, approximately 15% by weight of sucrose, and approximately 15% by weight of raw eggs.

3 Claims, No Drawings

LACTOSE-FREE SYNTHETIC ICE CREAM

This invention relates to a synthetic ice cream and, more particularly, to a lactose-free ice cream product.

BACKGROUND OF THE INVENTION

There are an increasing number of adults who cannot tolerate milk products, including ice cream. The principal reason for this intolerance is lactase deficiency. Lactase is the intestinal enzyme needed for proper digestion of lactose, the major sugar contained in milk. Lactose digestion takes place in the intestines, but if it is not digested, it passes unchanged into the colon. When this occurs, bacteria residing in the colon causes the lactose to ferment, creating hydrogen carbon dioxide. Thus, those persons suffering from lactase deficiency experience such symptoms as bloating, cramps, diarrhea, and gas when they ingest dairy products, including ice cream.

Although only 6% to 8% of the Caucasians in America and Western Europe suffer from lactase deficiency, approximately ⅔ of the adult population worldwide are lactase deficient in varying degrees. Even though certain non-dairy products have been developed, there are no known lactose-free synthetic ice cream products which have the texture, body, flavor, and palatability of actual commercial ice cream products.

SUMMARY OF THE INVENTION

The novel synthetic ice cream product is prepared from commercial non-dairy products, along with protein, suitable sweeteners, and flavoring. The product may be readily frozen and has the same keeping characteristics of conventional ice cream. Because the synthetic ice cream is free of lactose, it can be ingested by those persons having lactase deficiency without incurring any of the undesirable effects of the lactose containing commercial ice creams.

It is, therefore, a general object of this invention to provide a novel lactose-free ice cream product which has the taste, appearance, palatability, and aroma of conventional ice cream products.

A more specific object of this invention is to provide a novel lactose-free ice cream product and method of making the same which includes as its principal ingredients commercial non-dairy products.

DESCRIPTION OF THE PREFERRED EMBODIMENT

In accordance with the present invention, a novel lactose-free ice cream product is prepared by blending commercial non-dairy products, carbohydrates, and fats to form a homogenized mixture which is then frozen. Suitable flavoring may be added to impart the desired flavor to the product. It has been found that this novel ice cream product has all of the characteristics, including taste, appearance, palatability, aroma, and keeping qualities as commercial ice cream products which are made from milk.

Conventional ice creams are made from a combination of milk products, including cream, butter, butterfat, or milk in one of its various forms: whole fluid milk, evaporated milk, skim milk, condensed milk, sweetened dried milk, or dried skim milk. These milk products, for the most part, contain various concentrations of lactose and cannot be ingested by lactase deficient persons. The present product uses non-dairy emulsions which include vegetable fats or oils. The preferred oils or fats in the emulsion may include coconut oil, palm kernel oil, and soybean oil.

In the present invention, certain of the non-dairy milk and cream substitutes which comprise a water and oil emulsion may be used. In the preferred embodiment, the non-dairy emulsion consists of a homogenized blend of vegetable oil, emulsifier, stabilizer, protein, and water. Thus, a commercial non-dairy product using coconut oil may be used, such as the one sold under the Trademark "MELLO" by Consolidated Dairy Products Company, Seattle, Wash., or the milk substitute product sold under the Trademark "RICH'S COFFEE CREAMER" and distributed by Rich Products Corporation, Buffalo, N.Y. These types of commercial liquid, non-dairy milk substitutes include approximately 20% by weight of vegetable oils (coconut or corn oil), approximately 77% by weight of water, approximately 1% by weight of protein, approximately 0.7% by weight of emulsifiers, and approximately 0.3% by weight of stabilizers. Stabilizers and emulsifiers may include polysorbate, sodium stearyl-2-lactylate, and mono-diglycerides. The present lactose-free ice cream uses from about 42% to about 48%, preferably 45%, by weight of this non-dairy milk substitute emulsion. This emulsion, along with carbohydrates, sweeteners, and proteins, imparts the pleasing smooth texture to the product.

In order to provide the synthetic ice cream with a flavor comparable to the conventional milk product ice creams, carbohydrates, such as sugar, may be used to sweeten the product. It will be appreciated that the low temperature characteristics of frozen desserts tends to blunt the taste buds so that a substantial amount of sweetener is used. In the present invention, approximately 14% to 16% by weight of sucrose is used and, in the preferred embodiment, approximately 15% by weight of sucrose is used. It is pointed out, however, that other sweeteners, such as glucose and corn syrup, may also be used. Syrups tend to give added smoothness to a product.

Flavorings may also be added to the synthetic ice cream product, but only in amounts that will impart a mild, pleasant flavor. Since the present ice cream product does not contain milk components, such as cream or butterfat, there is no need or concern to retain the natural flavor of such cream or butterfat. The flavoring may be any of the commercial flavors employed in ice cream, such as vanilla, chocolate, extracts, fruits, nuts, spices, and the like. It will further be appreciated that many flavor variations may be obtained by combinations of the basic flavors.

In order to impart good body to the synthetic ice cream, additional hydrogenated or partially hydrogenated vegetable fat is provided. It is preferred that a mixture of hydrogenated coconut oil, palm kernel oil, and soybean oil be used along with protein, sweetener, emulsifier, stabilizer, and water. Again, it is pointed out that there are commercial non-dairy products containing these ingredients, such as the frozen whipped topping compositions sold by General Foods Corporation, White Plains, N.Y., under the trade name "COOL WHIP". The non-diary emulsion produced and sold by General Foods Corporation is comprised essentially of approximately 26% by weight of hydrogenated vegetable fat, approximately 1.1% by weight of protein, approximately 0.75% by weight of a stabilizer (carrageenan and guar gum), 0.95% by weight of emulsifiers (sorbitan monostearate), approximately 47% by weight of water, and approximately 22% by weight of carbohydrate (sugar). The frozen whipped topping may also include small amounts of flavoring (vanilla) and coloring (beta carotene). This product is a homogenized whipped emulsion, which is frozen and has excellent keeping qualities. Other non-dairy products rich in vegetable fats, such as RED OWL
Non-Dairy Whipped Topping
Distributed by: Red Owl Marketing Corp. Minneapolis, Minn.

IGA ®
Non-Dairy Whipped Topping
Distributed by: Independent Grocer's Association Chicago, Ill.

Flav-o-rite
Non-Dairy Whipped Topping
Distributed by: Preferred Products Eden Praire, Minn.

Dutch Maid
Non-Dairy Whipped Topping
Distributed by: Pure Packed Foods, Inc. Arlington, Tenn.

may also be used. In the preferred embodiment, approximately 20% to 28% by weight of the whipped vegetable fat rich commercial non-dairy product is used.

The synthetic ice cream also contains protein and the preferred source of protein is whole eggs. In addition to being a source of protein, whole eggs are also desirable for providing an additional source of fat and for also producing a leavening effect to the synthetic ice cream.

In this regard, the yolks are separated from the egg whites and each is separately mixed with the other ingredients. The egg yolks contain approximately 31% by weight of lipids and, of course, also contain phosphoproteins. The egg yolks also serve to bind particles into a homogenous blend.

The egg whites are also beaten to form a colloid of air bubbles surrounded by albumen which has been denatured during the agitation process. This lends stability to the foam and the foamed egg whites produced a leavening effect to the synthetic ice cream, as well as imparting a light and fluffy texture. In the embodiment shown, the synthetic ice cream contains approximately 12% to 18% by weight of whole eggs.

The following is an example of the synthetic lactose-free ice cream product:

| Ingredient | Percent by Weight (Range) | Preferred Percent by Weight |
|---|---|---|
| Liquid non-dairy emulsion | 42 to 48 | 45 |
| Foamed non-dairy emulsion | 20 to 28 | 25 |
| Sucrose | 14 to 16 | 15 |
| Proteins (whole eggs) | 14 to 16 | 15 |
| Vanilla (25 to 40 ml) | — | — |

Approximately 120 grams of raw egg whites were mechanically agitated until the whites became foamy. Approximately 123 grams of sucrose (granulated sugar) was blended with the foamed egg whites while containing the agitation until the mixture became stiff. Approximately 80 grams of raw egg yolks were slowly blended into the mixture to homogenize the ingredients into a smooth fluffy mixture. Approximately 710 milliliters of liquid non-dairy emulsion (RICH'S DAIRY CREAMER) was slowly blended into the mixture while containing mechanical mixing to form a homogenous blend. Approximately 340 grams of a foamed non-dairy emulsion (COOL WHIP) was blended into the mixture while continuing mechanical agitation thereof to form a homogenous mixture. Thirty milliliters of vanilla flavoring was slowly blended onto the mixture so that it was evenly dispersed through the blend.

The homogenous batter was then frozen while mechanically agitating the mixture to form the synthetic ice cream. The ice cream had the texture, body, taste, aroma, and palatability of the more expensive commercial vanilla ice creams prepared from milk products.

What is claimed is:

1. A frozen lactose-free synthetic ice cream product comprising from about 42% to 48% by weight of a liquid non-dairy emulsion comprised of approximately 20% by weight of vegetable fat, approximately 1% by weight of protein, approximately 0.7% by weight of emulsifier, approximately 0.3% by weight of stabilizer, and approximately 77% by weight of water, from about 20% to 28% by weight of a stable foamed non-dairy emulsion comprised of approximately 26% by weight of hydrogenated vegetable fat, approximately b 1% by weight of protein, approximately 0.9% by weight of emulsifier, approximately 0.76% by weight of a stabilizer, approximately 22% by weight of a carbohydrate, and approximately 47% by weight of water, approximately 14% to 16% by weight of sucrose, and approximately 14% to 16% by weight of whole eggs.

2. A frozen lactose-free synthetic ice cream product comprising approximately 45% by weight of a liquid non-dairy emulsion comprised of approximately 20% by weight of vegetable fat, approximately 1% by weight of protein, approximately 0.7% by weight of emulsifier, approximately 0.3% by weight of a stabilizer, and approximately 77% by weight of water, approximately 25% by weight of a stable foamed non-dairy emulsion comprised of approximately 26% by weight of hydrogenated vegetable fat, approximately 1% by weight of protein, approximately 0.9% by weight of emulsifier, approximately 0.76% by weight of a stabilizer, approximately 22% by weight of a carbohydrate, and approximately 47% by weight of water, approximately 14% to 16% by weight of sucrose, and approximately 14% to 16% by weight of whole eggs.

3. The lactose-free synthetic ice cream product as defined in claim 1 and a flavor material in an amount to impart a discernible flavor.

* * * * *